United States Patent
Hada et al.

(10) Patent No.: US 8,128,769 B1
(45) Date of Patent: Mar. 6, 2012

(54) SYSTEM AND METHOD FOR CONTINUOUSLY MANUFACTURING LIQUID CRYSTAL DISPLAY DEVICE

(75) Inventors: Kazuya Hada, Ibaraki (JP); Satoshi Hirata, Ibaraki (JP); Seiji Kondo, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/081,610

(22) Filed: Apr. 7, 2011

(30) Foreign Application Priority Data

Sep. 29, 2010 (JP) .................................. 2010-218238

(51) Int. Cl.
*B32B 41/00* (2006.01)
(52) U.S. Cl. .......... 156/64; 156/361; 156/366; 156/367; 156/368
(58) Field of Classification Search .................... 156/64, 156/361, 366, 367, 368
See application file for complete search history.

(56) References Cited

U.S. PATENT DOCUMENTS

| | | | |
|---|---|---|---|
| 7,022,204 B2 | 4/2006 | Kanbara et al. | |
| 2005/0174526 A1 | 8/2005 | Yu | |
| 2006/0185796 A1* | 8/2006 | Hayasaka et al. ............. | 156/361 |
| 2009/0260738 A1* | 10/2009 | Kitada et al. .................... | 156/64 |
| 2010/0283943 A1 | 11/2010 | Kimura et al. | |
| 2010/0288420 A1 | 11/2010 | Kimura et al. | |
| 2010/0316817 A1 | 12/2010 | Kimura et al. | |

FOREIGN PATENT DOCUMENTS

| | | | |
|---|---|---|---|
| JP | 57-052017 | A | 3/1982 |
| JP | 2002-127258 | A | 5/2002 |
| JP | 2004-276579 | A | 10/2004 |
| JP | 2004-338408 | A | 12/2004 |
| JP | 2004-361741 | A | 12/2004 |
| JP | 2010-030744 | A | 2/2010 |
| KR | 10-2005-0079720 | A | 8/2005 |
| TW | 201008726 | A1 | 3/2010 |
| WO | 2009/128207 | A1 | 10/2009 |

OTHER PUBLICATIONS

Notice of Allowance of Korean Application No. 10-2011-4602, mailing date of Apr. 6, 2011.
Japanese Office Action dated Dec. 10, 2010, issued in corresponding Japanese Patent Application No. 2010-218238.
Taiwanese Office Action dated Oct. 31, 2011, issued in corresponding Taiwanese Patent Application No. 099137669.

* cited by examiner

*Primary Examiner* — George Koch
(74) *Attorney, Agent, or Firm* — Westerman, Hattori, Daniels & Adrian, LLP

(57) ABSTRACT

A system and a method for continuously manufacturing a liquid crystal display device, which can suppress the occurrence of stripe defects, are provided, and the system includes carrier film feeding means; peeling means for peeling off a sheet piece of a polarizing film and a pressure-sensitive adhesive from a carrier film; take-up means for taking up the carrier film; bonding means for bonding the sheet piece to a liquid crystal panel with the pressure-sensitive adhesive interposed therebetween to form a liquid crystal display device; and speed control means for controlling the take-up means and the bonding means so that the carrier film can be folded back while it is allowed to protrude from the front end of the peeling means toward the bonding means at least at a peeling-off end time when peeling off the sheet piece from the carrier film is completed.

11 Claims, 4 Drawing Sheets

SYSTEM AND METHOD FOR CONTINUOUSLY MANUFACTURING LIQUID CRYSTAL DISPLAY DEVICE

BACKGROUND OF THE INVENTION

1. Field of the Invention

The invention relates to a system and a method for continuously manufacturing a liquid crystal display device by a process including peeling off a sheet piece of a polarizing film from a carrier film and bonding the sheet piece to a liquid crystal panel with a pressure-sensitive adhesive interposed therebetween.

2. Description of the Related Art

A known method includes providing a carrier film on which a sheet piece of a polarizing film is formed with a pressure-sensitive adhesive interposed therebetween, peeling off the sheet piece of the polarizing film and the pressure-sensitive adhesive from the carrier film by inwardly folding back the carrier film at a front end, and bonding the sheet piece of the polarizing film, which is peeled off, to a liquid crystal panel with the pressure-sensitive adhesive interposed therebetween (see Japanese Patent Application Laid-Open (JP-A) No. 57-052017 and JP-A No. 2004-361714).

Unfortunately, so-called stripe defects (linear air bubbles) sometimes occur in liquid crystal display devices manufactured by the method disclosed in JP-A No. 57-052017 or JP-A No. 2004-361741, in which while a sheet piece of a polarizing film is peeled off from a carrier film simply by inwardly folding back the carrier film, the sheet piece peeled off from the carrier film is bonded to a liquid crystal panel by holding them between bonding rollers.

SUMMARY OF THE INVENTION

The invention has been accomplished under the circumstances, and an object of the invention is to provide a system and a method for manufacturing a liquid crystal display device, which can suppress the occurrence of stripe defects.

As a result of investigation to solve the problems, the invention described below has been completed.

The invention is directed to a system for continuously manufacturing a liquid crystal display device, including: carrier film feeding means for feeding a carrier film on which a sheet piece of a polarizing film is formed with a pressure-sensitive adhesive interposed therebetween; peeling means for peeling off the sheet piece and the pressure-sensitive adhesive from the carrier film by inwardly folding back, at its front end, the carrier film fed by the carrier film feeding means; take-up means for taking up the carrier film from which the sheet piece is peeled off by the peeling means; bonding means for bonding the sheet piece, which is peeled off from the carrier film by the peeling means, to a liquid crystal panel with the pressure-sensitive adhesive interposed therebetween while feeding the liquid crystal panel so that a liquid crystal display device can be formed; and speed control means for controlling the take-up means and the bonding means in such a manner that the carrier film can be folded back at the front end of the peeling means from a bonding start time when bonding the sheet piece is started to an intermediate time and that the carrier film can be folded back while it is allowed to protrude from the front end of the peeling means toward the bonding means from the intermediate time to a peeling-off end time when peeling off the sheet piece from the carrier film is completed.

According to this feature, the carrier film is allowed to protrude from the front end of the peeling means as it is pulled by the sheet piece of the polarizing film being bonded to the liquid crystal panel, so that the timing of peeling off the rear part of the sheet piece of the polarizing film is delayed, which makes it possible to peel off the rear end of the sheet piece of the polarizing film after it is allowed to protrude from the front end of the peeling means toward the bonding site. When the carrier film is allowed to protrude, the radius R1 of peel curvature at the position where the sheet piece of the polarizing film is peeled off can be made smaller than the radius R2 of peel curvature at the front end of the peeling means, so that the peel angle can be made smaller. As a result, the rear part of the sheet piece of the polarizing film can be stably peeled off from the carrier film at a smaller peel angle (typically, the polarizing film can be prevented from vibration generated by swing of the polarizing film), when the sheet piece of the polarizing film is bonded to the liquid crystal panel, so that the occurrence of so-called stripe defects can be suppressed.

In an embodiment of the invention, during the period from a bonding start time when bonding the sheet piece is started to the peeling-off end time of the sheet piece, the speed control means preferably provides at least a specific time period over which the relation V1<V2 is satisfied, wherein V1 represents the speed at which the carrier film is taken up by the take-up means, and V2 represents the speed at which the sheet piece is bonded by the bonding means. According to this feature, the advantageous effects of the invention can be easily obtained.

In an embodiment of the invention, the speed control means may control the take-up means and the bonding means in such a manner that the relation V1=V2 is satisfied from the bonding start time to an intermediate time before the peeling-off end time and that the relation V1<V2 is satisfied from the intermediate time to the peeling-off end time. According to this feature, the advantageous effects of the invention can be easily obtained. The speed control means preferably controls the take-up means and the bonding means in such a manner that the take-up speed V1 and the bonding speed V2 are reduced before the intermediate time while kept equal to each other and that the relation V1<V2 is satisfied from the intermediate time to the peeling-off end time. According to this feature, the peeling off can be finished at a lower speed, which makes it possible to further stabilize the peeling off and to further suppress the occurrence of stripe defects.

In an embodiment of the invention, the carrier film feeding means may have a dancer roller through which the carrier film is fed to the peeling means. According to this feature, the carrier film can be automatically shifted back to the upstream side after the peeling off is completed, so that the reset for the bonding of the next sheet piece of the polarizing film can be easily achieved. Alternatively, a method including placing a feed roller upstream of the peeling means and turning the feed roller against the normal direction of rotation may be used as the method for automatically shifting back the carrier film after the completion of the peeling off.

The invention is also directed to a method for continuously manufacturing a liquid crystal display device, including: a carrier film feeding step including feeding a carrier film on which a sheet piece of a polarizing film is formed with a pressure-sensitive adhesive interposed therebetween; a peeling off step including peeling off the sheet piece of the polarizing film and the pressure-sensitive adhesive from the carrier film by using peeling means to inwardly fold back, at its front end, the carrier film fed by the carrier film feeding step; a take-up step including taking up the carrier film, from which the sheet piece is peeled off by the peeling off step, using take-up means; a bonding step including bonding the sheet piece, which is peeled off from the carrier film by the peeling off step, to a liquid crystal panel with the pressure-sensitive adhesive interposed therebetween using bonding means while feeding the liquid crystal panel so that a liquid crystal display device is formed; and a speed control step comprising controlling the take-up means and the bonding means in such a manner that the carrier film can be folded back at the front end of the peeling means from a bonding start time when bonding the sheet piece is started to an intermediate time and that the carrier film can be folded back while it is allowed to protrude from the front end of the peeling means toward the bonding means from the intermediate time to a peeling-off end time when peeling off the sheet piece from the carrier film is completed.

According to this feature, the carrier film is allowed to protrude from the front end of the peeling means as it is pulled by the sheet piece of the polarizing film being bonded to the liquid crystal panel, so that the timing of peeling off the rear part of the sheet piece of the polarizing film is delayed, which makes it possible to peel off the rear end of the sheet piece of the polarizing film after it is allowed to protrude from the front end of the peeling means toward the bonding site. When the carrier film is allowed to protrude, the radius R1 of peel curvature at the position where the sheet piece of the polarizing film is peeled off can be made smaller than the radius R2 of peel curvature at the front end of the peeling means, so that the peel angle can be made smaller. As a result, the rear part of the sheet piece of the polarizing film can be stably peeled off from the carrier film at a smaller peel angle (typically, the polarizing film can be prevented from being swingingly displaced), when the sheet piece of the polarizing film is bonded to the liquid crystal panel, so that the occurrence of so-called stripe defects can be suppressed.

In the speed control step according to an embodiment of the invention, at least a specific time period over which the relation $V1<V2$ is satisfied is preferably provided during the period from a bonding start time when bonding the sheet piece is started to the peeling-off end time of the sheet piece, wherein V1 represents the speed at which the carrier film is taken up by the take-up means, and V2 represents the speed at which the sheet piece is bonded by the bonding means. According to this feature, the advantageous effects of the invention can be easily obtained.

In the speed control step according to an embodiment of the invention, the take-up means and the bonding means may be controlled in such a manner that the relation $V1=V2$ is satisfied from the bonding start time to an intermediate time before the peeling-off end time and that the relation $V1<V2$ is satisfied from the intermediate time to the peeling-off end time. According to this feature, the advantageous effects of the invention can be easily obtained. Also in the speed control step, the take-up means and the bonding means are preferably controlled in such a manner that the take-up speed V1 and the bonding speed V2 are reduced before the intermediate time while kept equal to each other and that the relation $V1<V2$ is satisfied from the intermediate time to the peeling-off end time. According to this feature, the peeling off can be finished at a lower speed, which makes it possible to further stabilize the peeling off and to further suppress the occurrence of stripe defects.

In an embodiment of the invention, the carrier film feeding step may include feeding the carrier film to the peeling means through a dancer roller. According to this feature, the carrier film can be automatically shifted back to the upstream side after the peeling off is completed, so that the reset for the bonding of the next sheet piece of the polarizing film can be easily achieved.

DETAILED DESCRIPTION OF THE PREFERRED EMBODIMENTS

Polarizing Film and Continuous Roll

In an embodiment of the invention, the polarizing film may be formed on the carrier film in any mode. For example, they may be wound to form a continuous roll. For example, the continuous roll may be (1) a roll of an optical film laminate including a carrier film and a polarizing film formed on the carrier film with a pressure-sensitive adhesive interposed therebetween. In this case, the system for continuously manufacturing a liquid crystal display device has cutting means for cutting the polarizing film into sheet pieces of the polarizing film in such a manner that the polarizing film and the pressure-sensitive adhesive are cut at predetermined intervals, while the carrier film is left uncut (cutting means for performing half-cutting). For example, the cutting may be performed in such a manner as to classify non-defective and defective sheet pieces based on the result of an inspection performed using a defect inspection apparatus in the continuous manufacturing system.

Alternatively, for example, the continuous roll may be (2) a roll of an optical film laminate including a carrier film and sheet pieces of a polarizing film formed on the carrier film with a pressure-sensitive adhesive interposed therebetween (a continuous roll of a so-called scored polarizing film).

Figure 1:
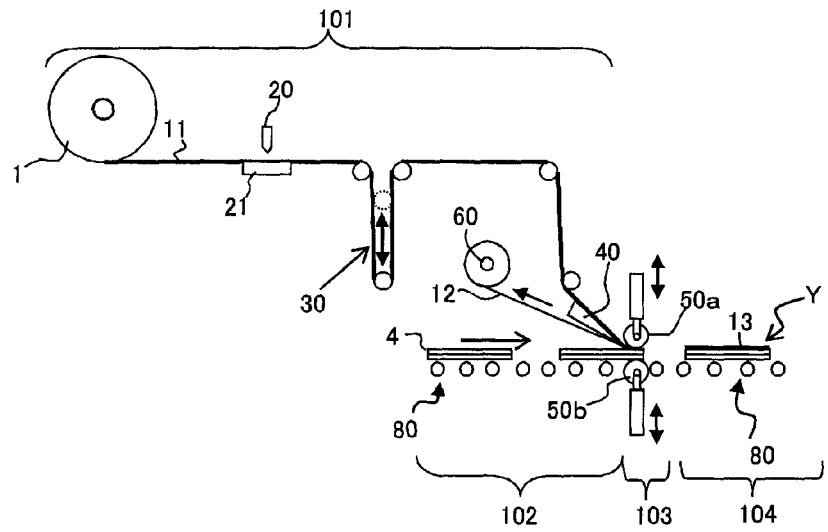
FIG. 1 is a schematic diagram showing an example of the liquid crystal display device-manufacturing system.

For example, the first continuous roll 1 shown in FIG. 1 is a roll of a first optical film laminate 11 including a first carrier film 12 and a first polarizing film 13 formed on the first carrier film 12 with a first pressure-sensitive adhesive interposed therebetween.

For example, the polarizing film includes a polarizer (about 5 to about 80 µm in thickness) and a polarizer protecting film or films (generally about 1 to about 500 µm in thickness) formed on one or both sides of the polarizer with or without an adhesive. The first optical film laminate 11 may further include any other film such as a retardation film (generally 10 to 200 µm in thickness), a viewing angle compensation film, a brightness enhancement film, or a surface protecting film. The thickness of the optical film laminate is typically in the range of 10 µm to 500 µm. The pressure-sensitive adhesive interposed between the polarizing film and the carrier film may be of any type such as an acryl-based pressure-sensitive adhesive, a silicone pressure-sensitive adhesive, or a urethane pressure-sensitive adhesive. For example, the thickness of the pressure-sensitive adhesive is preferably in the range of 10 to 50 µm. For example, the carrier film to be used may be such a known conventional film as a plastic film (e.g., a polyethylene terephthalate film or a polyolefin film). According to conventional techniques, any appropriate film such as a film coated with an appropriate release agent such as a silicone, long-chain alkyl or fluoride release agent, or molybdenum sulfide may also be used as needed.

Liquid Crystal Display Device

The liquid crystal display device includes a liquid crystal panel and a sheet piece or pieces of a polarizing film provided on one or both sides of the liquid crystal panel, into which a driving circuit is incorporated as needed. Any type of liquid crystal panel such as a vertical alignment (VA) or in-plane switching (IPS) type liquid crystal panel may be used. The liquid crystal panel 4 shown in FIG. 1 has a structure including a pair of substrates (first and second substrates 41 and 42) opposed to each other and a liquid crystal layer sealed in between the substrates.

Embodiment 1

In this embodiment, the system for continuously manufacturing a liquid crystal display device includes: carrier film feeding means for feeding a carrier film on which a sheet piece of a polarizing film is formed with a pressure-sensitive adhesive interposed therebetween; peeling means for peeling off the sheet piece and the pressure-sensitive adhesive from the carrier film by inwardly folding back, at its front end, the carrier film fed by the carrier film feeding means; take-up means for taking up the carrier film from which the sheet piece is peeled off by the peeling means; and bonding means for bonding the sheet piece, which is peeled off from the carrier film by the peeling means, to a liquid crystal panel with the pressure-sensitive adhesive interposed therebetween while feeding the liquid crystal panel so that a liquid crystal display device can be formed. The system also includes speed control means for controlling the take-up means and the bonding means so that the carrier film can be folded back while it is allowed to protrude from the front end of the peeling means toward the bonding means at least at a peeling-off end time when peeling off the sheet piece from the carrier film is completed. The system and method according to the embodiment for continuously manufacturing a liquid crystal display device are more specifically described below with reference to FIG. 1, which are not intended to limit the scope of the invention.

The system for continuously manufacturing a liquid crystal display device includes first carrier film feeding means 101, first liquid crystal panel feeding means 102, first bonding means 103 (including a first bonding roller 50a and a first drive roller 50b), second liquid crystal panel feeding means 104, second carrier film feeding means, second bonding means (including a second bonding roller and a second drive roller), and liquid crystal display device feeding means. In the embodiment, a first sheet piece of a first polarizing film is bonded to a liquid crystal panel from the upper side, and then after the liquid crystal panel with the first sheet piece bonded thereto is turned over (upside down and optionally turned by 90°), a second sheet piece of a second polarizing film is bonded to the liquid crystal panel from the upper side. Alternatively, the first sheet piece may be bonded to the liquid crystal panel from the lower side, and then after the liquid crystal panel is turned over, the second sheet piece may be bonded to the liquid crystal panel from the lower side. Alternatively, after the first sheet piece is bonded to the liquid crystal panel from the upper side, the second sheet piece may be bonded to the liquid crystal panel from the lower side without turning over the liquid crystal panel, or after the first sheet piece is bonded to the liquid crystal panel from the lower side, the second sheet piece may be bonded to the liquid crystal panel from the upper side without turning over the liquid crystal panel.

First Liquid Crystal Panel Feeding Means

The first liquid crystal panel feeding means 102 transports and supplies the liquid crystal panel 4 to the first bonding means 103. In the embodiment, the first liquid crystal panel feeding means 102 includes a feed roller 80, a suction plate, or the like. The liquid crystal panel 4 is fed to the downstream side of the manufacturing line by rotating the feed roller 80 or shifting the suction plate.

First Carrier Film Feeding Means

The first carrier film feeding means 101 feeds the first optical film laminate 11 from the first continuous roll 1, cuts the first polarizing film and the pressure-sensitive adhesive at predetermined intervals to form a sheet piece 13 (first sheet piece) of the first polarizing film on the first carrier film 12, peels off the first sheet piece 13 and the pressure-sensitive adhesive from the first carrier film 12 by inwardly folding back the first carrier film 12 at the front end of the first peeling means 40, and feeds the first sheet piece 13 and the pressure-sensitive adhesive to the first bonding means 103. For the operation, the first carrier film feeding means 101 includes first cutting means 20, a first dancer roller 30, first peeling means 40, and first take-up means 60.

The first cutting means 20 holds the first optical film laminate 11 from the first carrier film 12 side by suction means 21 and cuts the first polarizing film and the pressure-sensitive adhesive to form the first sheet piece 13 on the first carrier film 12. For example, the first cutting means 20 may be a cutter, a laser, or the like.

The first dancer roller 30 has the function of maintaining tension on the first carrier film 12 (absorbing fluctuations in tension). The first carrier film feeding means 101 feeds the first carrier film 12 through the first dancer roller 30. The first dancer roller 30 can function to allow the first carrier film 12 to protrude from the front end of the first peeling means 40. After peeling off the first sheet piece 13 from the first carrier film 12 is completed during the bonding process, the first dancer roller 30 also automatically shifts the first carrier film 12 back to the upstream side from the position ahead of the front end of the first peeling means 40.

In order to bond the first sheet piece 13 to the liquid crystal panel 4, the first peeling means 40 inwardly folds back the first carrier film 12 at its front end to peel off the first sheet piece 13 and the pressure-sensitive adhesive from the first carrier film 12. In the embodiment, a sharp knife edge is used as a non-limiting example of the front end of the first peeling means 40. For example, the sharp knife edge shown in FIG. 4 may have a radius R2 of curvature of 0.3 mm to 5.0 mm (corresponding to the radius of peel curvature).

The first take-up means 60 may be a roller which takes up the first carrier film 12 from which the first sheet piece 13 and the pressure-sensitive adhesive are peeled off. During the process of bonding the first sheet piece 13, the speed V1 at which the first carrier film 12 is taken up by the first take-up means 60 is controlled by first speed control means 110 as described below.

First Bonding Means

The first bonding means 103 bonds the first sheet piece 13 to the liquid crystal panel 4 from the upper side with the pressure-sensitive adhesive interposed therebetween, when the liquid crystal panel 4 and the first sheet piece 13 are fed by the first liquid crystal panel feeding means 102 and the first carrier film feeding means 101, respectively. In the embodiment, the first bonding means 103 includes a first bonding roller 50a and a first drive roller 50b. During the process of bonding the first sheet piece 13, the speed of the rotation of the first drive roller 50b is controlled by the speed control means 110 described below. It has a mechanism in which as the first drive roller 50*b* is driven, the first bonding roller 50*a* is driven accordingly. Such a mechanism is non-limiting, and alternatively, the relationship between the driver and the follower may be reversed in the mechanism, or both may be drive mechanisms.

First Speed Control Means

Figure 2:
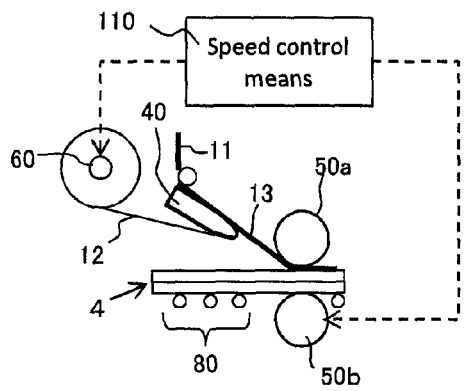
FIG. 2 is a schematic diagram showing an example of the liquid crystal display device-manufacturing system.
Figure 3:
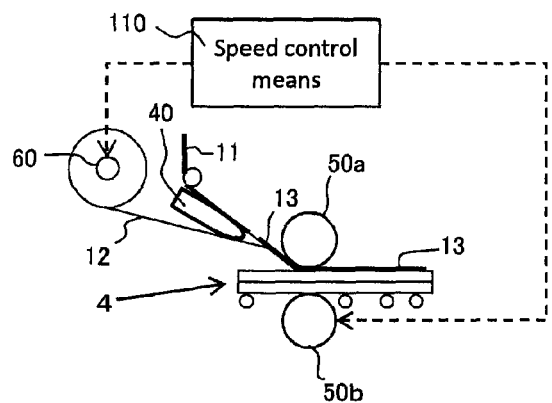
FIG. 3 is a schematic diagram showing an example of the liquid crystal display device-manufacturing system.

The first speed control means 110 may be a controller which controls the first take-up means 60 and the first drive roller 50*b* synchronously so that the speed V1 at which the first carrier film 12 is taken up (feed speed) and the speed V2 at which the liquid crystal panel 4 is subjected to the bonding (feed speed) can be controlled during the process of bonding the first sheet piece 13 (see FIGS. 2 and 3).

For example, the first speed control means 110 may control the first take-up means 60 of the first carrier film feeding means 101 so that the speed at which the first carrier film 12 is taken up (feed speed) can be controlled. Alternatively, a feed roller (not shown) located downstream of the first peeling means 40 may be controlled so that the first carrier film 12 feed speed can be controlled. Alternatively, the first speed control means 110 may control the rotational speed of the first drive roller 50*b* so that the speed V2 at which the liquid crystal panel 4 is subjected to the bonding (feed speed) can be controlled.

For example, the first speed control means 110 controls the first take-up means 60 and the first drive roller 50*b* so that at least a specific time period over which the relation V1<V2 is satisfied can be provided during the period from the bonding start time when bonding the polarizing film is started to the peeling-off end time when peeling off the first sheet piece 13 is completed.

Figure 4:
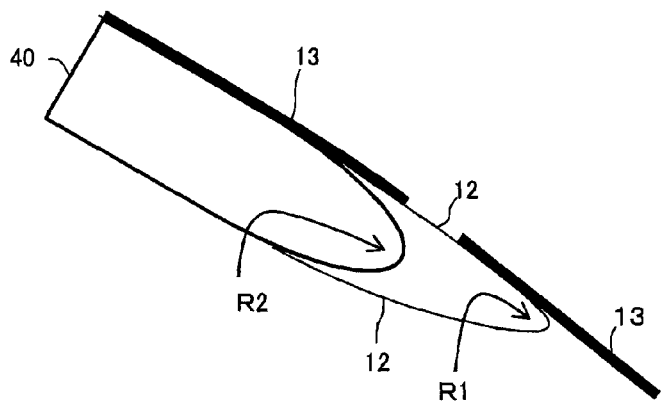
FIG. 4 is a diagram for illustrating the radii (R1 and R2) of peel curvature of the polarizing film.

As shown in FIGS. 3 and 4, when the first feed speed control means 110 makes the speed V1 at which the first carrier film 12 is taken up smaller than the speed V2 at which the liquid crystal panel 4 is subjected to the bonding (V1<V2), the position where the first sheet piece 13 is peeled off (the position where the carrier film is folded back) is allowed to go ahead of the front end of the first peeling means 40 toward the position where the bonding is performed by the first bonding roller 50*a*, and the radius R1 of peel curvature at the position where the first sheet piece 13 allowed to go ahead is peeled off can be made smaller than the radius R2 of peel curvature at the front end of the first peeling means 40 in the process of peeling off the first sheet piece 13 and the pressure-sensitive adhesive from the first carrier film 12. This makes it possible to stably peel off the first sheet piece 13 and the pressure-sensitive adhesive from the first carrier film 12 (typically to prevent the first sheet piece 13 from being swingingly displaced) and to bond the first sheet piece 13 to the liquid crystal panel 4 in a satisfactory manner, so that the occurrence of so-called stripe defects in the liquid crystal panel 4 can be suppressed.

Figure 5:
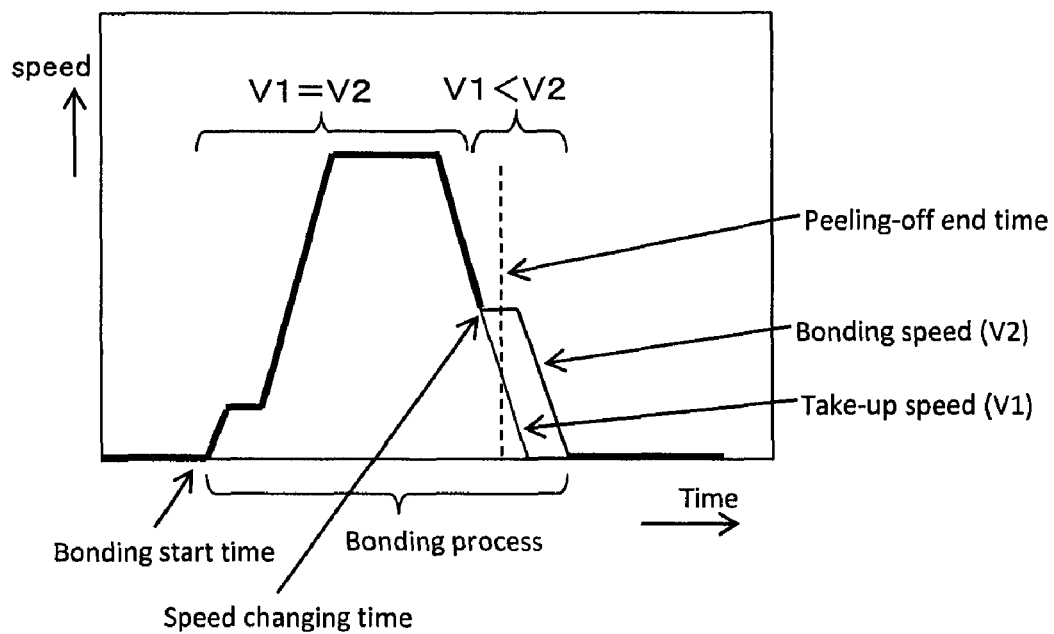
FIG. 5 is a diagram for illustrating a typical mode of the feed speeds (V1 and V2)

As shown in FIG. 5, for example, the first speed control means 110 also controls the first take-up means 60 and the first drive roller 50*b* in such a manner that the relation V1=V2 is satisfied from the bonding start time to an intermediate time (hereinafter referred to as "speed changing time") before the peeling-off end time and that the relation V1<V2 is satisfied from the speed changing time to the peeling-off end time. The first speed control means 110 preferably controls the first take-up means 60 and the first drive roller 50*b* in such a manner that the take-up speed V1 and the bonding speed V2 are reduced before the speed changing time while kept equal to each other and that the relation V1<V2 is satisfied from the speed changing time to the peeling-off end time. In this case, the peeling off is finished at a reduced speed, so that the peeling off can be further stabilized and that the occurrence of stripe defects can be further suppressed.

Second Liquid Crystal Panel Feeding Means

The second liquid crystal panel feeding means 104 transports and supplies, to the second bonding means, the liquid crystal panel 4 with the first sheet piece 13 bonded thereto by the first bonding means 103. The second liquid crystal panel feeding means 104 includes a turning mechanism (not shown) for horizontally turning by 90° the liquid crystal panel 4 with the first sheet piece 13 bonded thereto and a turn-over mechanism for turning over the liquid crystal panel 4 with the first sheet piece 13 bonded thereto.

A variety of means and apparatuses as described above may be used as means for bonding the sheet piece of the polarizing film to the other surface of the liquid crystal panel 4. The second carrier film feeding means may have the same device configuration as the first carrier film feeding means, and the second bonding means may have the same device configuration as the first bonding means. For example, the second dancer roller may have the same device configuration as the first dancer roller 30, the second take-up means may have the same device configuration as the first take-up means 60, and the second bonding roller and the second drive roller may have the same mechanism as the first bonding roller 50*a* and the first drive roller 50*b*. The second speed control means may also have the same function as the first speed control means.

The liquid crystal display device feeding means (not shown) may include a feed roller, a suction plate or any other component for feeding downstream the liquid crystal display device Y formed by the second bonding means. An inspection apparatus for inspecting the liquid crystal display device Y may also be provided at a downstream feed site. The purpose and method of the inspection with the inspection apparatus are not restricted.

Continuous Manufacturing Method

The method according to the embodiment for manufacturing a liquid crystal display device includes: a carrier film feeding step including feeding a carrier film on which a sheet piece of a polarizing film is formed with a pressure-sensitive adhesive interposed therebetween; a peeling off step including peeling off the sheet piece of the polarizing film and the pressure-sensitive adhesive from the carrier film by using peeling means to inwardly fold back, at its front end, the carrier film fed by the carrier film feeding step; a take-up step including taking up the carrier film, from which the sheet piece is peeled off by the peeling off step, using take-up means; a bonding step including bonding the sheet piece, which is peeled off from the carrier film by the peeling off step, to a liquid crystal panel with the pressure-sensitive adhesive interposed therebetween using bonding means while feeding the liquid crystal panel so that a liquid crystal display device is formed; and a speed control step including controlling the take-up means and the bonding means so that the carrier film can be folded back while it is allowed to protrude from the front end of the peeling means toward the bonding means at least at a peeling-off end time when peeling off the sheet piece from the carrier film is completed.

First Bonding Step

The first bonding step includes bonding a first sheet piece of a first polarizing film to a first substrate of a liquid crystal panel, wherein the first polarizing film is fed from a first continuous roll. In the embodiment, the first optical film laminate 11 is fed from the first continuous roll 1 which is a roll of the first optical film laminate 11 including the first carrier film 12 and the first polarizing film formed on the first carrier film 12. The first polarizing film and the pressure-sensitive adhesive are then cut while the first carrier film 12 is left (uncut), so that a first sheet piece 13 of the first polarizing film is formed on the first carrier film 12. The first carrier film 12 is then inwardly folded back at the front end of the first peeling means 40 and fed so that the first sheet piece 13 and the pressure-sensitive adhesive are peeled off from the first carrier film 12. The first sheet piece 13 peeled off from the first carrier film 12 is then bonded to the first substrate of the liquid crystal panel 4 with the pressure-sensitive adhesive interposed therebetween.

First Speed Control Step

The first speed control step includes controlling the first take-up means 60 and the first bonding means 103 so that the first carrier film 12 can be folded back while it is allowed to protrude from the front end of the first peeling means 40 toward the first bonding means 103 at least at the peeling-off end time when peeling off the first sheet piece 13 from the first carrier film 12 is completed.

In the first speed control step, at least a specific time period over which the relation V1<V2 is satisfied should be provided during the period from the bonding start time when bonding the first sheet piece 13 is started to the peeling-off end time when peeling off the first sheet piece 13 is completed, wherein V1 represents the speed at which the first carrier film 12 is taken up by the first take-up means 60, and V2 represents the speed at which the first sheet piece 13 of the first polarizing film is bonded by the first bonding means 103.

In another embodiment, the first speed control step includes controlling the first take-up means 60 and the first bonding means 103 in such a manner that the relation V1=V2 is satisfied from the bonding start time to an intermediate time before the peeling-off end time and that the relation V1<V2 is satisfied from the intermediate time to the peeling-off end time. The first speed control step preferably includes controlling the first take-up means 60 and the first bonding means 103 in such a manner that the take-up speed V1 and the bonding speed V2 are reduced before the intermediate time while kept equal to each other and that the relation V1<V2 is satisfied from the intermediate time to the peeling-off end time.

In the continuous manufacturing method, the carrier film feeding step includes feeding the carrier film in such a manner that tension on the carrier film can be maintained. In the embodiment, the first dancer roller 30 is used to maintain tension on the first carrier film 12.

When the polarizing film is also bonded to the other substrate of the liquid crystal panel 4, the method should further include the step of turning and turning over the liquid crystal panel. The step of turning and turning over includes horizontally turning by 90° the liquid crystal panel 4 with the first polarizing film 14 bonded thereto and turning over the liquid crystal panel 4. The step of bonding a sheet piece of the second polarizing film may be performed in the same manner as the first bonding step, and the second speed control step may also be performed in the same manner as the first speed control step.

Other Embodiments

In Embodiment 1, the optical film laminate is fed from the continuous roll and cut at predetermined intervals. In the invention, this feature is non-limiting. Alternatively, for example, the optical film laminate fed from the continuous roll may be inspected for defects and cut in such a manner that defects are avoided based on the result of the inspection (by so-called skip cutting). Alternatively, defect information previously attached to the optical film laminate may be read out, and the optical film laminate may be cut in such a manner that defects are avoided based on the defect information.

The first and second polarizing films in the first and second continuous rolls may also have previously undergone cutting. Specifically, the first and second continuous rolls to be used may be so-called scored continuous rolls. In this case, the first and second cutting means are unnecessary, so that the tact time can be reduced.

EXAMPLES

Figure 6:
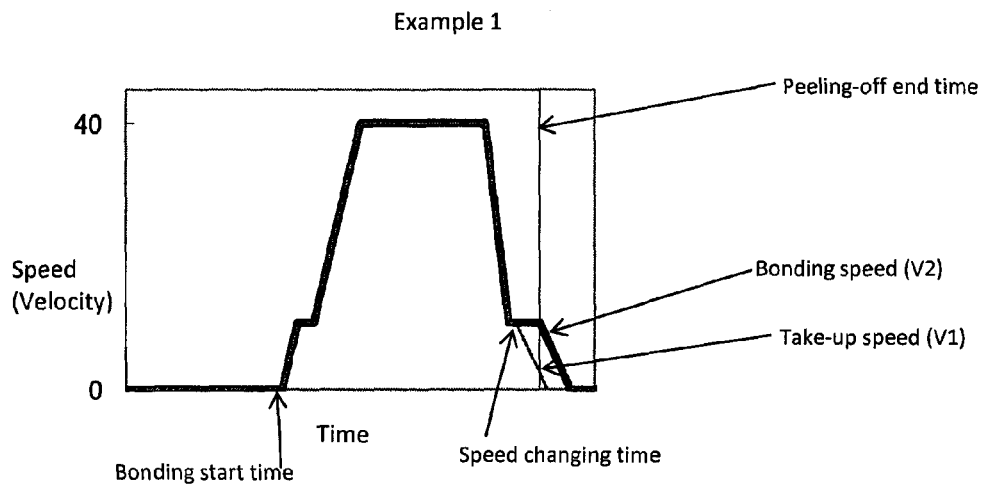
FIG. 6 is a diagram showing feed speed (V1 and V2) conditions in Examples.
Figure 6:
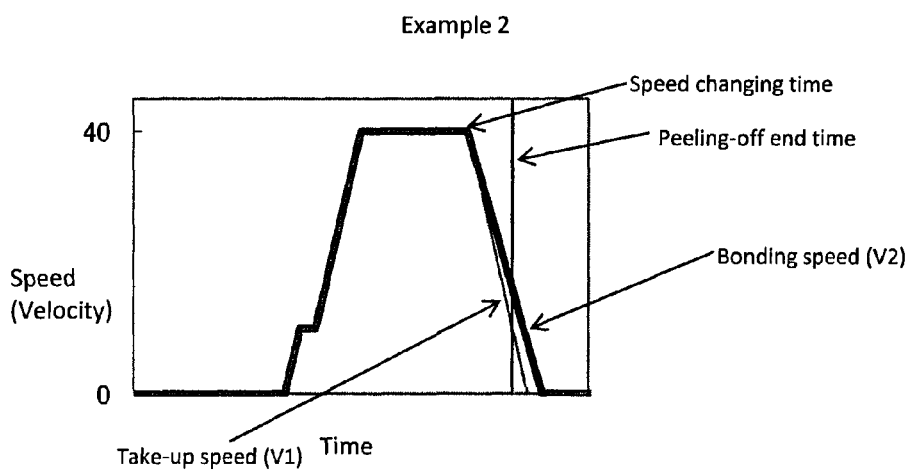
Figure 6:
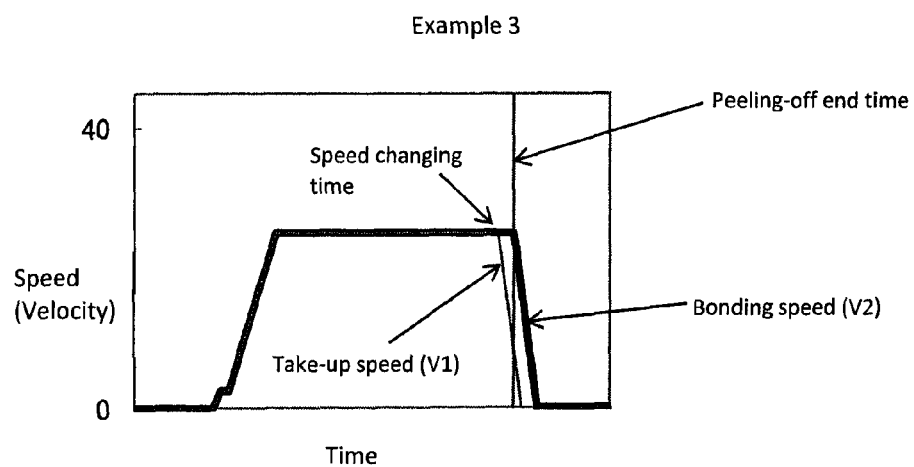
Figure 7:
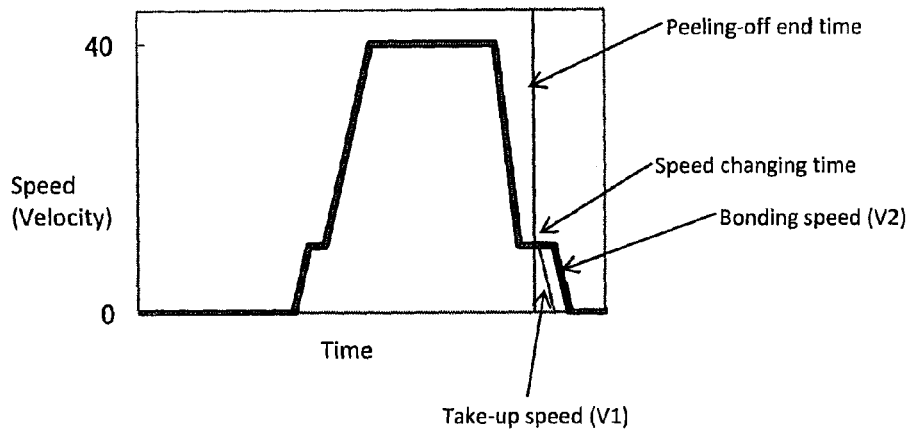
FIG. 7 is a diagram showing feed speed (V1 and V2) conditions in Comparative Examples.
Figure 7:
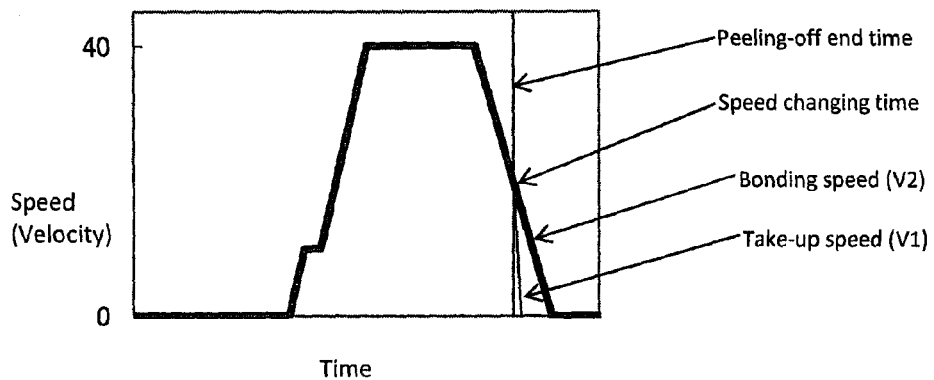
Figure 7:
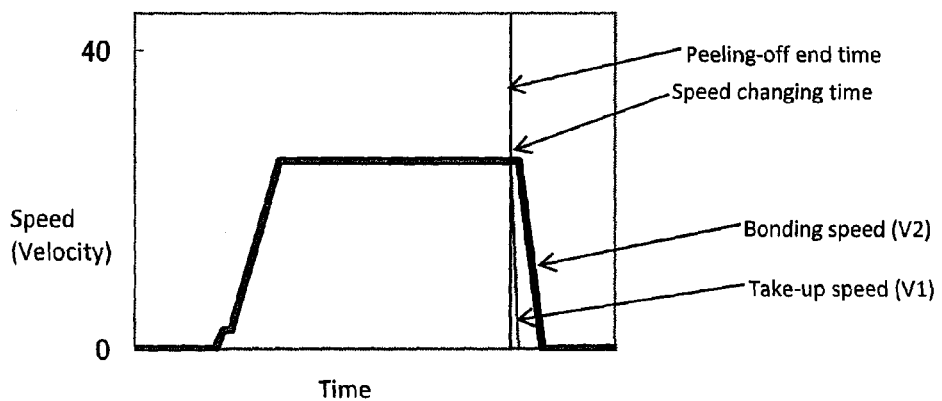

A polarizing film was bonded to a liquid crystal panel (40 inches) from the long side using the manufacturing system shown in FIG. 1 under the speed conditions shown in FIG. 6 (Examples 1 to 3) or FIG. 7 (Comparative Examples 1 to 3).

Example 1 included reducing both the take-up speed (V1: the carrier film feed speed) and the bonding speed (V2: the liquid crystal panel feed speed) from the maximum speed, then further reducing only the take-up speed (V1), and setting the bonding speed (V2) around the peeling-off end time at a constant speed. Example 2 included reducing the take-up speed (V1) and the bonding speed (V2) from the maximum speed while making a difference between them (V1<V2) and setting the bonding speed (V2) around the peeling-off end time during the reduction in speed. Example 3 included reducing only the take-up speed (V1) from the maximum speed before the peeling-off end time and setting the bonding speed (V2) around the peeling-off end time at a constant speed.

Comparative Example 1 included reducing both the take-up speed (V1) and the bonding speed (V2) from the maximum speed, then setting, at a constant speed, the bonding speed (V2) and the take-up speed (V1) around the peeling-off end time, and then reducing the take-up speed (V1) while keeping the bonding speed (V2) constant. Comparative Example 2 included reducing both the take-up speed (V1) and the bonding speed (V2) from the maximum speed and then, after the peeling-off end time, reducing the take-up speed (V1) and the bonding speed (V2) while making a difference between them (V1<V2). Comparative Example 3 included reducing only the take-up speed (V1) from the maximum speed at the same time as the peeling-off end time and setting the bonding speed (V2) around the peeling-off end time at a constant speed.

Evaluation Method

In each of the examples and the comparative examples, the rate of the occurrence of stripes in 300 pieces (n=300) was evaluated by visual inspection. Table 1 shows the results.

TABLE 1

|  | Stripe occurrence rate (%) |
|---|---|
| Example 1 | 0.0 |
| Example 2 | 0.3 |
| Example 3 | 0.3 |
| Comparative Example 1 | 1.0 |
| Comparative Example 2 | 1.0 |
| Comparative Example 3 | 0.2 |

The results in Table 1 show that the stripe occurrence rate is lower in Examples 1 to 3 than in Comparative Examples 1 to 3. The result of Example 1 shows that the speed control process including reducing the take-up speed (V1) and the bonding speed (V2) from the maximum speed and then further reducing the carrier film take-up speed (V1) than the bonding speed (V2) while keeping the bonding speed (V2) constant until the peeling off is ended is more effective than the speed control processes in Examples 2 and 3.

What is claimed is:

1. A system for continuously manufacturing a liquid crystal display device, comprising:
   carrier film feeding means for feeding a carrier film on which a sheet piece of a polarizing film is formed with a pressure-sensitive adhesive interposed therebetween;
   peeling means for peeling off the sheet piece and the pressure-sensitive adhesive from the carrier film by inwardly folding back, at its front end, the carrier film fed by the carrier film feeding means;
   take-up means for taking up the carrier film from which the sheet piece is peeled off by the peeling means;
   bonding means for bonding the sheet piece, which is peeled off from the carrier film by the peeling means, to a liquid crystal panel with the pressure-sensitive adhesive interposed therebetween while feeding the liquid crystal panel so that a liquid crystal display device can be formed; and
   speed control means for controlling the take-up means and the bonding means in such a manner that the carrier film can be folded back at the front end of the peeling means from a bonding start time when bonding the sheet piece is started to an intermediate time and that the carrier film can be folded back while it is allowed to protrude from the front end of the peeling means toward the bonding means from the intermediate time to a peeling-off end time when peeling off the sheet piece from the carrier film is completed.

2. The system according to claim 1, wherein during a period from a bonding start time when bonding the sheet piece is started to the peeling-off end time of the sheet piece, the speed control means provides at least a specific time period over which the relation $V1<V2$ is satisfied, wherein $V1$ represents a speed at which the carrier film is taken up by the take-up means, and $V2$ represents a speed at which the sheet piece is bonded by the bonding means.

3. The system according to claim 1 or 2, wherein the speed control means controls the take-up means and the bonding means in such a manner that the relation $V1=V2$ is satisfied from the bonding start time to an intermediate time before the peeling-off end time and that the relation $V1<V2$ is satisfied from the intermediate time to the peeling-off end time.

4. The system according to claim 3, wherein the speed control means controls the take-up means and the bonding means in such a manner that the take-up speed $V1$ and the bonding speed $V2$ are reduced before the intermediate time while kept equal to each other and that the relation $V1<V2$ is satisfied from the intermediate time to the peeling-off end time.

5. The system according to claim 1, wherein the carrier film feeding means has a dancer roller through which the carrier film is fed to the peeling means.

6. A method for continuously manufacturing a liquid crystal display device, comprising:
   a carrier film feeding step comprising feeding a carrier film on which a sheet piece of a polarizing film is formed with a pressure-sensitive adhesive interposed therebetween;
   a peeling off step comprising peeling off the sheet piece of the polarizing film and the pressure-sensitive adhesive from the carrier film by using peeling means to inwardly fold back, at its front end, the carrier film fed by the carrier film feeding step;
   a take-up step comprising taking up the carrier film, from which the sheet piece is peeled off by the peeling off step, using take-up means;
   a bonding step comprising bonding the sheet piece, which is peeled off from the carrier film by the peeling off step, to a liquid crystal panel with the pressure-sensitive adhesive interposed therebetween using bonding means while feeding the liquid crystal panel so that a liquid crystal display device is formed; and
   a speed control step comprising controlling the take-up means and the bonding means in such a manner that the carrier film can be folded back at the front end of the peeling means from a bonding start time when bonding the sheet piece is started to an intermediate time and that the carrier film can be folded back while it is allowed to protrude from the front end of the peeling means toward the bonding means from the intermediate time to a peeling-off end time when peeling off the sheet piece from the carrier film is completed.

7. The method according to claim 6, wherein in the speed control step, at least a specific time period over which the relation $V1<V2$ is satisfied is provided during a period from a bonding start time when bonding the sheet piece is started to the peeling-off end time of the sheet piece, wherein $V1$ represents a speed at which the carrier film is taken up by the take-up means, and $V2$ represents a speed at which the sheet piece is bonded by the bonding means.

8. The method according to claim 6 or 7, wherein in the speed control step, the take-up means and the bonding means are controlled in such a manner that the relation $V1=V2$ is satisfied from the bonding start time to an intermediate time before the peeling-off end time and that the relation $V1<V2$ is satisfied from the intermediate time to the peeling-off end time.

9. The method according to claim 8, wherein in the speed control step, the take-up means and the bonding means are controlled in such a manner that the take-up speed $V1$ and the bonding speed $V2$ are reduced before the intermediate time while kept equal to each other and that the relation $V1<V2$ is satisfied from the intermediate time to the peeling-off end time.

10. The method according to claim 6, wherein the carrier film feeding step includes feeding the carrier film to the peeling means through a dancer roller.

11. A system for continuously manufacturing a liquid crystal display device, comprising:
   a carrier film feeder configured to feed a carrier film on which a sheet piece of a polarizing film is formed with a pressure-sensitive adhesive interposed therebetween;
   a peeler configured to peel off the sheet piece and the pressure-sensitive adhesive from the carrier film by inwardly folding back, at its front end, the carrier film fed by the carrier film feeder;
   a take-up roller configured to taking up the carrier film from which the sheet piece is peeled off by the peeler;
   a bonding roller configured to bond the sheet piece, which is peeled off from the carrier film by the peeler, to a liquid crystal panel with the pressure-sensitive adhesive interposed therebetween while feeding the liquid crystal panel so that a liquid crystal display device can be formed; and
   a speed controller configured to control the take-up roller and the bonding roller in such a manner that the carrier film can be folded back at the front end of the peeler from a bonding start time when bonding the sheet piece is started to an intermediate time and that the carrier film can be folded back while it is allowed to protrude from the front end of the peeler toward the bonding roller from the intermediate time to a peeling-off end time when peeling off the sheet piece from the carrier film is completed.

* * * * *